United States Patent
Usuda

(10) Patent No.: US 10,514,098 B2
(45) Date of Patent: Dec. 24, 2019

(54) SEALING GASKET FOR PIPING SYSTEMS AND ITS MANUFACTURING PROCESS

(71) Applicant: PETROLEO BRASILEIRO S.A.—PETROBRAS, Rio de Janeiro, RJ (BR)

(72) Inventor: Paulo Koji Usuda, Sao Paulo (BR)

(73) Assignee: PETROLEO BRASILEIRO S.A.—PETROBRAS, Rio de Janeiro—RJ (BR)

( * ) Notice: Subject to any disclaimer, the term of this patent is extended or adjusted under 35 U.S.C. 154(b) by 209 days.

(21) Appl. No.: 15/351,666

(22) Filed: Nov. 15, 2016

(65) Prior Publication Data

US 2017/0138478 A1   May 18, 2017

(30) Foreign Application Priority Data

Nov. 17, 2015   (BR) .......................... 10-2015-028821

(51) Int. Cl.
*F16J 15/08* (2006.01)
*F16L 25/00* (2006.01)
*F16J 15/12* (2006.01)
*F16L 23/18* (2006.01)

(52) U.S. Cl.
CPC ....... *F16J 15/0806* (2013.01); *F16J 15/0818* (2013.01); *F16J 15/125* (2013.01); *F16L 23/18* (2013.01); *F16L 25/0018* (2013.01); *F16J 2015/0856* (2013.01)

(58) Field of Classification Search
CPC .... F16J 15/0806; F16J 15/0818; F16J 15/125; F16J 2015/0865; F16J 15/06; F16J 15/12; F16J 15/08; F16J 15/0825; F16L 23/18; F16L 25/0018; F16L 23/20; F16L 25/00
USPC ............................ 277/626, 215, 229, 235 R
See application file for complete search history.

(56) References Cited

U.S. PATENT DOCUMENTS

| | | | | |
|---|---|---|---|---|
| 2,357,257 A | * | 8/1944 | Goetze ................. | F16L 23/22 277/610 |
| 3,117,795 A | * | 1/1964 | Price ................... | F16J 15/125 277/610 |
| 5,195,759 A | * | 3/1993 | Nicholson ............. | F16J 15/125 277/652 |
| 5,308,090 A | | 5/1994 | Hamada et al. | |
| 2015/0316150 A1 | * | 11/2015 | Zhao ................... | F16J 15/0887 277/648 |

* cited by examiner

*Primary Examiner* — Nathan Cumar
(74) *Attorney, Agent, or Firm* — Sughrue Mion, PLLC

(57) ABSTRACT

The present invention is for sealing gaskets applicable to pipes, valves and boiler equipment. In this context, the present invention provides a sealing gasket for piping systems comprising (i) a core (10) formed by a plurality of concentric metal rings (10*a*), each ring (10*a*) comprising a substantially rectangular cross-section, wherein the height of the rectangular cross-section is the same for all the rings (10*a*), and (ii) surface coating (12) of flexible material applied to the upper and lower surfaces of the core (10). The present invention also provides the manufacturing process of said sealing gasket. Thus, the present invention provides a sealing gasket (i) that eliminates the need for an external rigid ring, (ii) that is easy to conform for reduced-diameter sealing gaskets and (iii) can be easily formed into different shapes, such as an oval shape, which is particularly useful for sealing between the body and the gate valve bonnet.

7 Claims, 4 Drawing Sheets

SEALING GASKET FOR PIPING SYSTEMS AND ITS MANUFACTURING PROCESS

INVENTION FIELD

The present invention is for sealing gaskets applicable to pipes, valves and boiler equipment.

BASIS OF THE INVENTION

Sealing gaskets in flanges are essential components in piping systems, ensuring integrity against leaks.

Some types of sealing gaskets perform well in certain applications, but may, however, not be suitable for other applications. Solid-core grooved sealing gaskets with a graphite coating are known by the trade name CAMPROFILE or KAMMPROFILE, and perform well for sealing equipment such as heat exchangers, for example. FIG. 1 illustrates a sectional view of a solid-core grooved sealing gasket with a graphite coating, known in the prior art. The inner part of the sealing gasket (right side of FIG. 1) includes grooves that receive an upper and lower graphite coating. This is the part that effectively functions as a sealing element. The outer part of the sealing gasket (left side of FIG. 1) does not include grooves or coating. This part functions as an external reinforcement ring.

Generally, solid-core grooved sealing gaskets with a graphite coating are shaped from a bar with an approximately rectangular cross-section, typically 13 mm wide. However, for sealing between the body and the valve bonnet in piping systems, where the diameter is very small (around 150 mm), shaping from a 13-mm bar to manufacture the sealing gasket becomes troublesome, and the appearance of defects on the sealing surfaces due to high stress in the material is very common.

Meanwhile, spiral wound sealing gaskets are formed by winding a metal strip with a cross-section in an approximate "V" shape, as shown in FIG. 2. This type of sealing gasket typically comprises a solid external reinforcement metal ring (not shown), which provides mechanical strength to the sealing gasket by increasing its performance. However, for sealing between the body and the valve bonnet in piping systems, where the space to install a sealing gasket is very limited, there is no room for sealing gaskets with an external reinforcement ring.

Even when using sealing gaskets that do not include an external reinforcement ring, as revealed by documents U.S. Pat. No. 5,308,090A and U.S. Pat. No. 2,357,257A, note that this type of sealing gasket does not perform well for sealing between the body and the valve bonnet, either because of its construction or because of the absence of a reinforcement ring.

In addition, it is known that sealing gaskets in gate valve bonnets are oval rather than circular. Thus, it becomes even more difficult to use solid-core or spiral wound sealing gaskets in the prior art since, due to the presence of its external rigid rings, it is difficult to form such sealing gaskets into an oval shape.

As will be shown in detail below, the present invention aims to solve the problems of the prior art described above, in a practical, efficient and low-cost manner.

SUMMARY OF THE INVENTION

The first objective of the present invention is to provide a flange sealing gasket between valve, pipe and equipment parts that does not require an external rigid ring, and yet offers good sealing performance.

The second objective of the present invention is to provide a flange sealing gasket between valve, pipe and equipment parts that is easy to conform for sealing gaskets with a reduced diameter and/or that are different from the conventional circular shape (oval, for example).

In order to achieve the above objectives, the present invention provides a sealing gasket for piping systems comprising (i) a core formed by a plurality of concentric metal rings, each ring comprising a substantially rectangular cross-section, wherein the height of the rectangular cross-section is the same for all the rings, and (ii) surface coating of flexible material applied on the upper and lower surfaces of the core.

Furthermore, the present invention provides a process of manufacturing a sealing gasket for piping systems, said process comprising steps to (i) provide a core formed by a plurality of concentric metal rings, each ring comprising a substantially rectangular cross-section, wherein the height of the rectangular cross-section is the same for all the rings, and (ii) apply a surface coating of flexible material applied to the upper and lower surfaces of the core.

BRIEF DESCRIPTION OF THE FIGURES

The detailed description set forth below refers to the accompanying figures and the respective reference numbers, representing the preferred embodiment of the present invention.

DETAILED DESCRIPTION OF THE INVENTION

First, it should be emphasized here that the description below will be based on preferred embodiments of the invention. As will be apparent to one skilled in the art, however, the invention is not limited to these particular embodiments.

Figure 1:
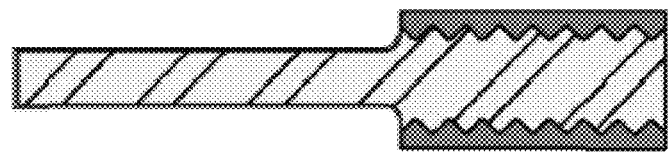
FIG. 1 illustrates a sectional view of a solid-core grooved sealing gasket with a graphite coating, as per the prior art.
Figure 2:
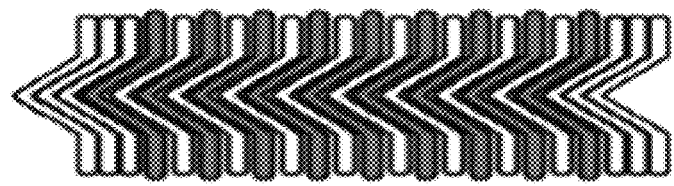
FIG. 2 illustrates a sectional view of a spiral wound sealing gasket, as per the prior art.
Figure 3:
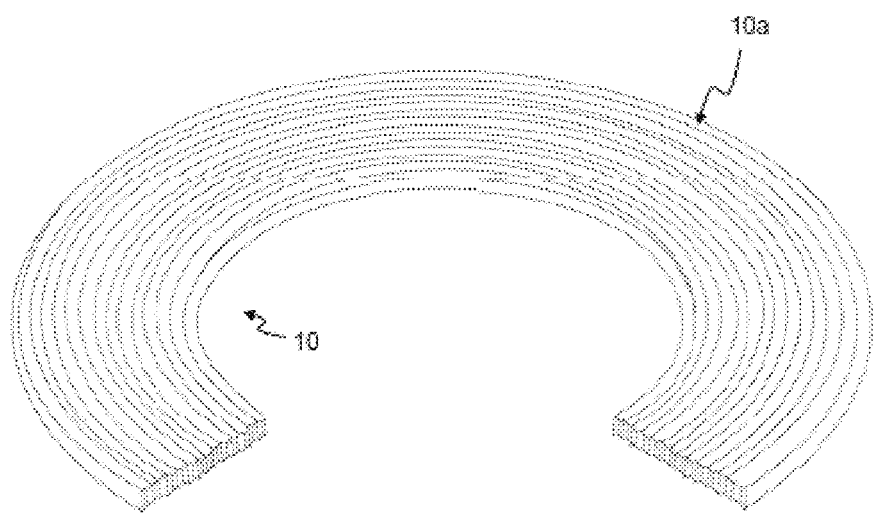
FIG. 3 illustrates an elevation view cutting the core of a sealing gasket according to a preferred embodiment of the present invention.

FIG. 3 illustrates an elevation view of the core 10 of a sealing gasket according to a preferred embodiment of the present invention. As can be seen, unlike the sealing gaskets of the prior art, the sealing gasket according to the present invention comprises a core 10 formed by a plurality of concentric metal rings 10a, each ring 10a comprising a substantially rectangular cross-section, wherein the height of the rectangular cross-section is the same for all the rings 10a.

Preferably, the core 10 of the sealing gasket of the present invention is formed by at least four concentric metal rings 10a.

Preferably, each concentric metal ring 10a comprises a square cross-section. Thus, all the rings 10a comprise the same height and width, so that the core of the sealing gasket has substantially flat upper and lower surfaces. More preferably, the height and width of the cross-section of the rings is 2 to 5 mm. Even more preferably, the height and width of the cross-section of the rings is 3 mm.

Thus, since the rings 10a have a relatively small width compared to other sealing gaskets of the prior art, it is extremely easy to mold them into the desired shape, be it circular, oval or any other. Also, it reduces the risk of structural failure as occurred in the prior art when attempting to conform, for example, a relatively thick metal bar (13 mm) to manufacture small-diameter sealing gaskets (150 mm).

Preferably, each concentric metal ring 10a is shaped from at least one metal bar of a rectangular section. More preferably, there is at least one metal bar that gives rise to the rings 10a comprising a square cross-section.

Optionally, there is at least one metal bar of a rectangular section comprising at least two opposite faces with grooves. Thus, the concentric metal rings will comprise at least one lower face and one upper face with grooves, which contribute to adhering a surface coating 12 of flexible material applied to the upper and lower surfaces of the core 10. Preferably, the flexible material used as a surface coating 12 is TEFLON or a flexible graphite.

Preferably, the gap between the rings 10a is the smallest gap possible that is feasible to manufacture. However, it is emphasized that this is not a critical factor, because the rings are concentric and there is no possibility of forming a preferred leakage channel of the fluid in the radial direction.

The present invention further provides a process of manufacturing the sealing gasket described above. The process of the present invention comprises the following steps:

a) providing the core 10 formed by a plurality of concentric metal rings 10a, each ring comprising a substantially rectangular cross-section, wherein the height of the rectangular cross-section is the same for all the rings 10a; and b) applying a surface coating 12 of flexible material applied to the upper and lower surfaces of the core.

As mentioned above, prior to the step of providing the core 10, each concentric metal ring 10a can be formed from at least one metal bar of a rectangular section, preferably square.

Preferably, the step of forming the rings 10a is done so as to form them into a circular shape, as illustrated in FIG. 3.

Figure 4:
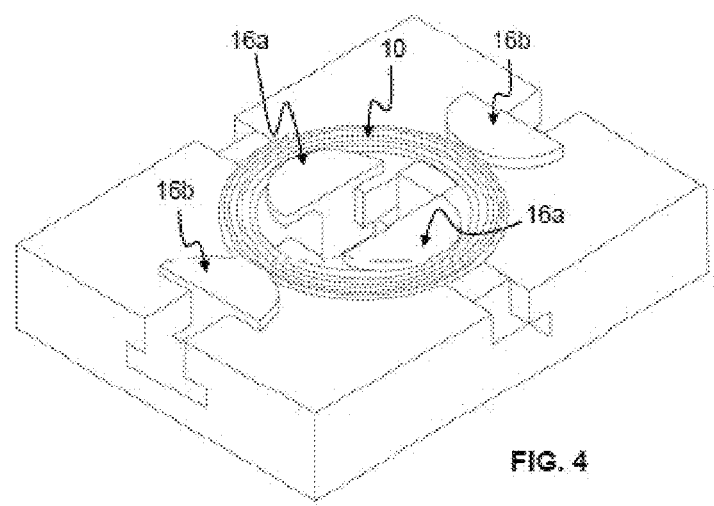
FIG. 4 illustrates an elevation view of the core of the sealing gasket according to the preferred embodiment of the present invention, shaped into an oval by a molding machine.
Figure 5:
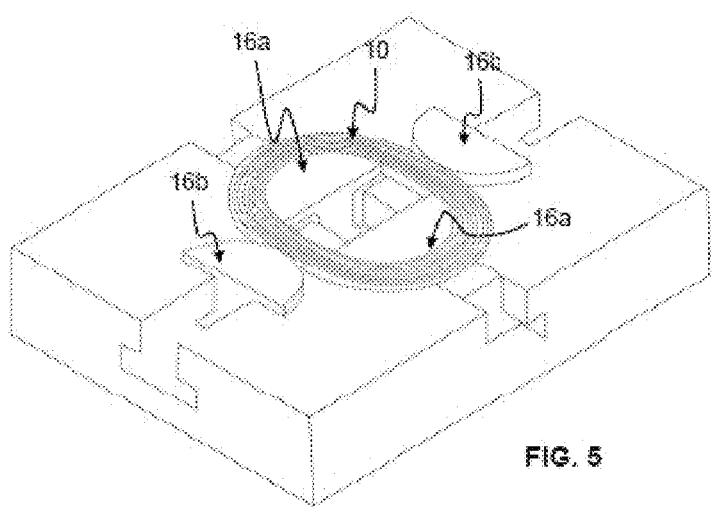
FIG. 5 illustrates an elevation view of the core of the sealing gasket according to the preferred embodiment of the present invention, already shaped into an oval by a molding machine.

Optionally, an additional step of forming the core 10 is provided, in which it is formed in a shape that is different from the original circular shape. Preferably, when used in a sealing gasket between the body and the gate valve bonnet, the core 10 is formed into an oval shape, as illustrated in FIGS. 4 and 5. At this stage, the core 10 is positioned in a forming device 14 comprising two tensioner molds 16a and two compressor molds 16b. Thus, the core is simultaneously tensioned and compressed in perpendicular directions, causing them to become oval in shape. In this step, a lid (not shown) is preferably provided on the core 10 so that it becomes confined during forming.

Figure 6:
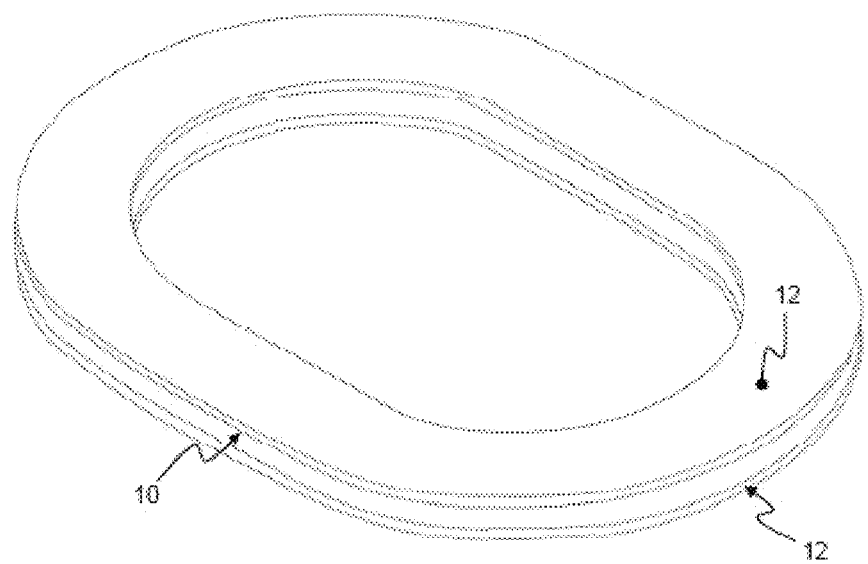
FIG. 6 illustrates an isometric view of the sealing gasket in a final, oval-shaped embodiment, after receiving a flexible-material coating of the sealing faces.

In the same manner as in the circular sealing gasket, as described above, a surface coating 12 of flexible material is applied to the upper and lower surfaces of the core 10, in an oval, so that the end embodiment of the oval sealing gasket is obtained (FIG. 6).

Thus, based on the description above, the present invention provides a sealing gasket that eliminates the need for an external rigid ring, still offering good sealing performance. In addition, the sealing gasket of the present invention easily conforms to reduced-diameter sealing gaskets. Also, the sealing gasket of the present invention can be easily formed into different shapes, such as an oval shape. As mentioned above, the oval-shaped sealing gasket is particularly useful for sealing between the body and the gate valve bonnet.

Furthermore, the present invention provides a process of manufacturing the sealing gasket mentioned above, from forming each metal ring to applying a flexible-material coating that will fill the empty spaces and ensure the gasket seal.

Numerous variations of this scope of protection of the present parent application are allowed. Thus, it is emphasized that the present invention is not limited to the particular configurations/embodiments described above.

The invention claimed is:

1. A sealing gasket for piping systems, comprising:
   a core (10) comprising a plurality of concentric metal rings (10a), each ring of the plurality of concentric metal rings comprising a rectangular cross-section, wherein the height of the rectangular cross-section is identical for all of the plurality of concentric metal rings (10a); and
   a surface coating (12) of a flexible material applied to upper and lower surfaces of the core (10),
   wherein the sealing gasket forms a circular or oval shape.

2. The sealing gasket of claim 1, wherein the plurality of concentric metal rings (10a) comprises at least four rings.

3. The sealing gasket, of claim 1, wherein each ring of the plurality of concentric metal rings (10a) comprises a substantially square cross-section.

4. The sealing gasket, of claim 3, wherein the height and a width of the cross-section of each ring of the plurality of concentric metal rings (10a) ranges from 2 to 5 mm.

5. The sealing gasket of claim 4, wherein the height and width of the cross-section of each ring of the plurality of concentric metal rings (10a) is 3 mm.

6. The sealing gasket of claim 1, wherein each ring of the plurality of concentric metal rings (10a) is formed from at least one metal bar of a rectangular cross-section.

7. The sealing gasket of claim 1, wherein the flexible material of the surface coating (12) is TEFLON or flexible graphite.

* * * * *